(12) United States Patent
Edara et al.

(10) Patent No.: US 11,762,868 B2
(45) Date of Patent: *Sep. 19, 2023

(54) METADATA MANAGEMENT FOR A TRANSACTIONAL STORAGE SYSTEM

(71) Applicant: Google LLC, Mountain View, CA (US)

(72) Inventors: Pavan Edara, Mountain View, CA (US); Yi Yang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 17/445,422

(22) Filed: Aug. 19, 2021

(65) Prior Publication Data

US 2021/0382892 A1 Dec. 9, 2021

Related U.S. Application Data

(63) Continuation of application No. 16/848,780, filed on Apr. 14, 2020, now Pat. No. 11,113,296.

(51) Int. Cl.
*G06F 16/24* (2019.01)
*G06F 16/245* (2019.01)
*G06F 16/2458* (2019.01)
*G06F 16/2455* (2019.01)

(52) U.S. Cl.
CPC .... *G06F 16/2477* (2019.01); *G06F 16/24558* (2019.01)

(58) Field of Classification Search
None
See application file for complete search history.

(56) References Cited

U.S. PATENT DOCUMENTS

| 7,158,991 B2 * | 1/2007 | Kekre ................. G06F 16/2477 |
| 8,498,967 B1 * | 7/2013 | Chatterjee ............... G06F 16/27 |
| | | 707/674 |
| 10,725,977 B1 * | 7/2020 | Chmiel ................. G06F 16/178 |
| 2014/0089264 A1 * | 3/2014 | Talagala .................. G06F 16/21 |
| | | 707/649 |

(Continued)

OTHER PUBLICATIONS

Indian Examination Report for the related Application No. 202247063062, dated Jan. 11, 2023, 8 pages.

*Primary Examiner* — Son T Hoang
(74) *Attorney, Agent, or Firm* — Honigman LLP; Brett A. Krueger

(57) ABSTRACT

A method for managing metadata for a transactional storage system include receiving a query request at a snapshot timestamp. The query request requests return of at least one data block from a plurality of data blocks. Each data block includes a corresponding write epoch timestamp and a corresponding conversion indicator indicating whether the data block is active or has been converted at a respective conversion timestamp. The method also includes setting a read epoch timestamp equal to the earliest one of the write epoch and determining whether any of the respective conversion timestamps occurring at or before the snapshot timestamp occur after the read epoch timestamp. The method also includes determining the at least one data block requested by the query request by scanning each of the data blocks including corresponding write epoch timestamps occurring at or after the read epoch timestamp.

20 Claims, 7 Drawing Sheets

(56) References Cited

U.S. PATENT DOCUMENTS

| | | |
|---|---|---|
| 2014/0172866 A1 | 6/2014 | Lin et al. |
| 2016/0132581 A1* | 5/2016 | Hsieh .................. G06F 16/2343 707/615 |
| 2016/0147812 A1* | 5/2016 | Andrei ................ G06F 16/2322 707/703 |
| 2020/0045134 A1* | 2/2020 | Rozas .................. G06F 16/245 |
| 2020/0110813 A1* | 4/2020 | Kamijoh ................ G06F 16/23 |

* cited by examiner

METADATA MANAGEMENT FOR A TRANSACTIONAL STORAGE SYSTEM

CROSS REFERENCE TO RELATED APPLICATIONS

This U.S. patent application is a continuation of, and claims priority under 35 U.S.C. § 120 from, U.S. patent application Ser. No. 16/848,780, filed on Apr. 14, 2020. The disclosure of this prior application is considered part of the disclosure of this application and is hereby incorporated by reference in its entirety.

TECHNICAL FIELD

This disclosure relates to metadata management for a transactional storage system.

BACKGROUND

As distributed storage (i.e., cloud storage) becomes increasingly popular, performance metrics for very large datasets has also become increasingly important. For example, when querying a very large table (e.g., a table multiple terabytes in size or larger) millions or more entries are often scanned to successfully respond to the query. In this scenario, the query can take several seconds to complete. This delay is exacerbated when many queries are received simultaneously.

SUMMARY

One aspect of the disclosure provides a method of metadata management for a transactional storage system. The method includes receiving, at data processing hardware, a query request at a snapshot timestamp. The query requests return of any data blocks from a plurality of data blocks stored on memory hardware in communication with the data processing hardware that match query parameters. Each data block includes a corresponding write epoch timestamp indicating a point in time the data block was stored on the memory hardware. Each data block further includes a corresponding conversion indicator indicating whether the data block is active at the snapshot timestamp or has been converted at a respective conversion timestamp occurring at or before the snapshot timestamp. The method also includes setting, by the data processing hardware, a read epoch timestamp equal to the earliest one of the write epoch timestamps corresponding to the data blocks that are active at the snapshot timestamp. The method also includes determining, by the data processing hardware, whether any of the respective conversion timestamps occurring at or before the snapshot timestamp occur after the read epoch timestamp. The method also includes, when none of the respective conversion timestamps occurring at or before the snapshot timestamp occur after the read epoch timestamp, determining, by the data processing hardware, whether any data blocks match the query parameters indicated by the query request by scanning each of the data blocks including corresponding write epoch timestamps occurring at or after the read epoch timestamp.

Implementations of the disclosure may include one or more of the following optional features. In some implementations when at least one of the respective conversion timestamps occurring at or before the snapshot timestamp occur after the read epoch timestamp, determining, by the data processing hardware, based on the at least one of the respective conversion timestamps occurring after the read epoch timestamp and at or before the snapshot timestamp, a read lower bound timestamp that occurs before the read epoch timestamp. In some examples, the method also includes determining, by the data processing hardware, the at least one data block requested by the query request by scanning each of the data blocks including corresponding write epoch timestamps occurring at or after the read lower bound timestamp.

Optionally, the method further includes updating, by the data processing hardware, the read epoch timestamp to a more recent point in time. In some examples, the method includes, beginning at the read epoch timestamp, sequentially scanning data blocks based on the respective write epoch timestamp of each data block, and when the conversion indicator of a scanned data block indicates the scanned block is active, determining that the updated read epoch timestamp is equivalent to the write epoch timestamp of the scanned data block. Updating the read epoch timestamp may further include, when the conversion indicator of each data block indicates that each scanned data block is converted, determining that the updated read epoch timestamp is equivalent to the snapshot timestamp.

In some implementations, the method includes sequentially scanning data blocks for a predetermined amount of time. Sequentially scanning the data blocks may include updating the write epoch timestamp of the data block with the oldest write epoch timestamp that the conversion indicator indicates is active.

Additionally, the method may include updating the write epoch timestamp of the data block with the oldest write epoch timestamp that is active and includes updating the write epoch timestamp to a more recent point in time. Updating the read epoch timestamp, in some examples, occurs after a data block is converted. Optionally, updating the read epoch timestamp occurs after a data block is converted and a threshold period of time has passed since the last point in time the read epoch timestamp was updated. In some implementations, updating the read epoch timestamp occurs after a predetermined amount of time has passed. The plurality of data blocks my also include a table.

Another aspect of the disclosure provides a system for metadata management for a transactional storage system. The system includes data processing hardware and memory hardware in communication with the data processing hardware. The memory hardware stores instructions that when executed on the data processing hardware cause the data processing hardware to perform operations. The operations include receiving a query request at a snapshot timestamp. The query request requests return of any data blocks from a plurality of data blocks stored on the memory hardware in communication with the data processing hardware that match query parameters. Each data block includes a corresponding write epoch timestamp indicating a point in time the data block was stored on the memory hardware. Each data block further includes a corresponding conversion indicator indicating whether the data block is active at the snapshot timestamp or has been converted at a respective conversion timestamp occurring at or before the snapshot timestamp. The operations also include setting a read epoch timestamp equal to the earliest one of the write epoch timestamps corresponding to the data blocks that are active at the snapshot timestamp. The operations also include determining whether any of the respective conversion timestamps occurring at or before the snapshot timestamp occur after the read epoch timestamp. The operations also include, when none of the respective conversion timestamps occurring at or before the snapshot timestamp occur after the read epoch timestamp, determining whether any data blocks match the query parameters indicated by the query request by scanning each of the data blocks including corresponding write epoch timestamps occurring at or after the read epoch timestamp.

Implementations of the disclosure may include one or more of the following optional features. In some implementations when at least one of the respective conversion timestamps occurring at or before the snapshot timestamp occur after the read epoch timestamp, determining based on the at least one of the respective conversion timestamps occurring after the read epoch timestamp and at or before the snapshot timestamp, a read lower bound timestamp that occurs before the read epoch timestamp. In some examples, the operations also include determining the at least one data block requested by the query request by scanning each of the data blocks including corresponding write epoch timestamps occurring at or after the read lower bound timestamp.

Optionally, the operations further include updating the read epoch timestamp to a more recent point in time. In some examples, the operations include, beginning at the read epoch timestamp, sequentially scanning data blocks based on the respective write epoch timestamp of each data block, and when the conversion indicator of a scanned data block indicates the scanned block is active, determining that the updated read epoch timestamp is equivalent to the write epoch timestamp of the scanned data block. Updating the read epoch timestamp may further include, when the conversion indicator of each data block indicates that each scanned data block is converted, determining that the updated read epoch timestamp is equivalent to the snapshot timestamp.

In some implementations, the operations include sequentially scanning data blocks for a predetermined amount of time. Sequentially scanning the data blocks may include updating the write epoch timestamp of the data block with the oldest write epoch timestamp that the conversion indicator indicates is active.

Additionally, the operations may include updating the write epoch timestamp of the data block with the oldest write epoch timestamp that is active and includes updating the write epoch timestamp to a more recent point in time. Updating the read epoch timestamp, in some examples, occurs after a data block is converted. Optionally, updating the read epoch timestamp occurs after a data block is converted and a threshold period of time has passed since the last point in time the read epoch timestamp was updated. In some implementations, updating the read epoch timestamp occurs after a predetermined amount of time has passed. The plurality of data blocks my also include a table.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Distributed storage (i.e., cloud storage) has been increasingly used to store tables of massive size. It is not uncommon for a table to have a size of multiple terabytes or even petabytes and to include millions of entries (i.e., data blocks). Querying (i.e., reading) these tables is often on the critical path for performance and attempting to scan or read millions of data blocks during a query significantly degrades operation of the distributed storage system as not only does the query take considerable time to complete, but other operations that depend upon the query must wait for it to finish. Thus, it is advantageous to reduce the amount of time a system requires to perform a query on a large table or other data structure.

In some distributed storage systems, data blocks (e.g., entries in a table) are initially written to the data structure (e.g., a table) in a write optimized format. At a later point in time, each data block is converted to read optimized format. When this occurs, a read-optimized version of the data block is created and the write-optimized data block is flagged as converted and marked for garbage collection (i.e., deletion). Periodically the system will remove all converted and marked data blocks (i.e., during a compaction step). This method maintains acceptable write performance on ingestion while also maintaining acceptable read performance after ingestion. Because the faster the data blocks are converted, the better the read performance for those blocks (which is key for real-time analytics), most systems attempt to convert each data block as quickly as possible. For example, an average amount of time for data conversion is four minutes.

Typical distributed storage systems, when performing a query on a large table, scan each data block. However, many of these data blocks are write-performance data blocks that have already been converted to read-performance data blocks and marked for deletion. Scanning write-optimized data blocks that have already been converted dramatically increases the overall scan time without assisting the query.

Implementations herein are directed toward a metadata manager for a distributed storage system that determines a write epoch timestamp for each data block associated with a table stored at the distributed storage system and a read epoch timestamp for the table. Each write epoch timestamp indicates a point in time the corresponding data block was stored in the table. Additionally, each data block includes a conversion indicator that indicates whether the data block is active or whether the data block has been converted at a respective conversion timestamp. The read epoch timestamp is set equal to the earliest one of the write epoch timestamps that are active. When receiving a read request at a snapshot timestamp, the system reads the data blocks by scanning or reading each of the data blocks that include a corresponding write epoch timestamp occurring at or after the read epoch timestamp.

Figure 1:
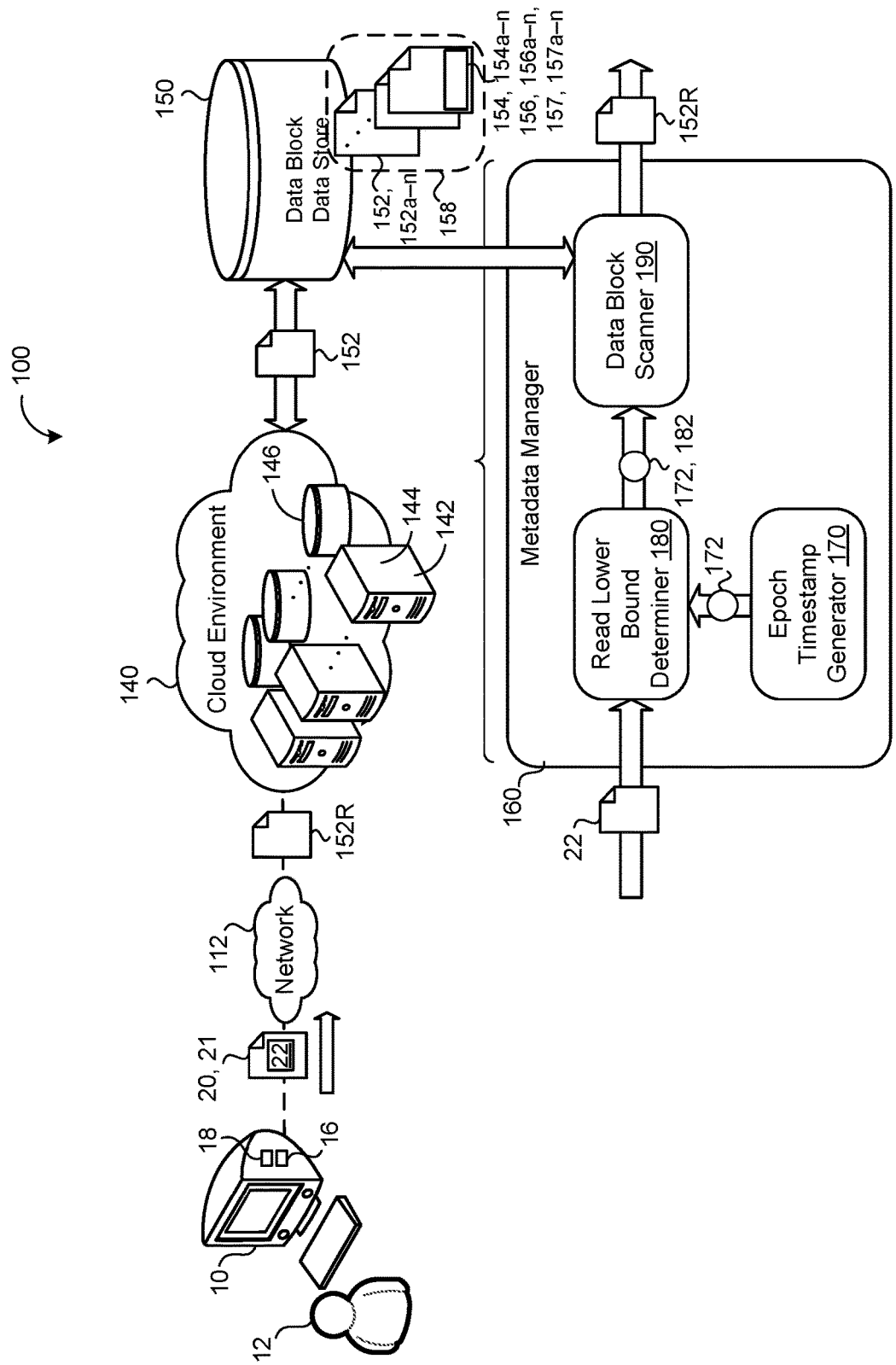
FIG. 1 is a schematic view of an example system for managing metadata for a transactional storage system.

Referring to FIG. 1, in some implementations, an example system 100 includes a user device 10 associated with a respective user 12 in communication with a remote system 140 via a network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware).

The remote system 140 may be a single computer, multiple computers, or a distributed system (e.g., a cloud environment) having scalable/elastic computing resources 144 (e.g., data processing hardware) and/or storage resources 142 (e.g., memory hardware). A data store 146 (i.e., a remote storage device 146) may be overlain on the storage resources 142 to allow scalable use of the storage resources 142 by one or more of the client or computing resources 144. The data store 146 includes a data block data store 150 configured to store a plurality of data blocks 152, 152a-n stored within a data structure 158. In some examples, the data structure 158 includes a table.

Each data block 152 includes a write epoch timestamp 154, 154a-n that indicates a point in time that the data block 152 was stored on the data block data store 150. Each data block 152 also includes a conversion indicator 156, 156a-n that indicates whether the data block 152 is active or has been converted at a respective conversion timestamp 157, 157a-n. That is, each data block 152 includes a write epoch timestamp 154 that generally indicates when the data block 152 was created (i.e., written to the data store 150) and, a conversion timestamp 157 that indicates when the data block 152 was converted. Thus, the write epoch timestamp 154 and conversion timestamp 157 together indicate a "lifespan" of the data block 152.

The remote system 140 is configured to receive a query request 20 from the user device 10 via the network 112. The query request 20, for example, includes a request to return any data blocks 152R that match query parameters 21 included within the query request (e.g., contain a certain keyword). Typically to complete the query request 20, each active data block 152 must be scanned or read to determine if the respective data block 152 satisfies the criteria of the query request 20. The remote system 140 executes a metadata manager 160 that receives the query request 20. The query request 20 includes a snapshot timestamp 22 that indicates a point in time that the remote system 140 should evaluate the data structure 158. That is, the snapshot timestamp 22 indicates a point in time between the current time and a point in time when the data structure 158 was created for use by the remote system 140 in evaluating the status (i.e., active or converted) of each data block 152 when performing the query. In some examples, the snapshot timestamp 22 is the current time. In other examples, the snapshot timestamp is an earlier point in time than the current time.

The metadata manager 160 includes an epoch timestamp generator 170 that sets a read epoch timestamp 172 equal to the earliest one of the write epoch timestamps 154 corresponding to the data blocks 152 that are active at the snapshot timestamp 22 of the query request 20. That is, the epoch timestamp generator 170 sets the read epoch timestamp 172 equal to the write epoch timestamp 154 (e.g., the creation time) of the "oldest" still active (i.e., not converted) data block 152. Put another way, every data block 152 with a write epoch timestamp 154 that is before the read epoch timestamp 172 has been converted.

Figure 2:
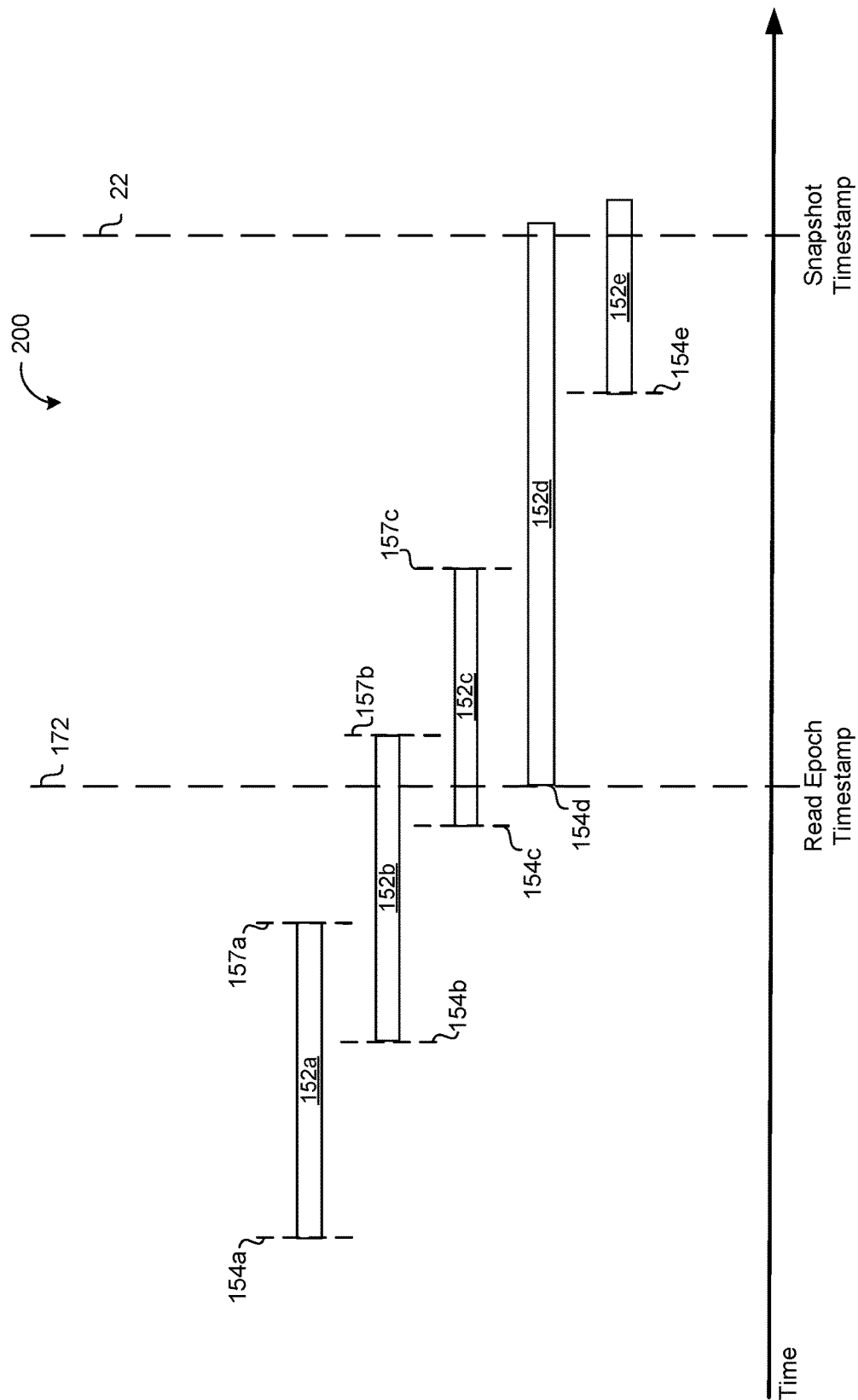
FIG. 2 is a schematic view of an exemplary timeline that includes a snapshot timestamp and a read epoch timestamp.

Referring now to FIG. 2, an exemplary timeline 200 illustrates the lifespans of five data blocks 152a-e over time. Each data block 152 has an associated write epoch timestamp 154a-e that corresponds with the point in time that the data block 152 was stored on the data store 150. The timeline 200 also illustrates the snapshot timestamp 22 that indicates the point in time that the remote system 140 should use to evaluate the data structure 158. Accordingly, data blocks 152a-c have a corresponding conversion timestamp 157a-c as each of the three data blocks 152a-c are converted by the snapshot timestamp 22. It should be noted that the two data blocks 152d, 152e do not have respective conversion timestamps 157 before the snapshot timestamp 22 as the data blocks 152d, 152e are still active at the snapshot timestamp 22 (i.e., have not been converted). Thus, in this example, there are three data blocks 152a-c converted and two data blocks 152d, 152e active at the snapshot timestamp 22. Here, the epoch timestamp generator 170 sets the read epoch timestamp 172 to equal the write epoch timestamp 154d of the data block 152d, as the data block 152d is the oldest still active data block 152 at the snapshot timestamp 22 (i.e., all earlier data blocks 152a-152c with an earlier write epoch timestamp 154a-c have been converted).

Referring back to FIG. 1, the metadata manager 160 includes a read lower bound determiner 180 that receives the snapshot timestamp 22 and the read epoch timestamp 172 and determines whether any of the respective conversion timestamps 157 occur after the read epoch timestamp 172. When none of the respective conversion timestamps 157 occurring at or before the snapshot timestamp 22 occur after the read epoch timestamp 172 (i.e., no "lifespans" of converted data blocks 152 overlap the read epoch timestamp 172), the read lower bound determiner 180 passes the read epoch timestamp 172 to a data block scanner 190.

The data block scanner 190 determines whether any data blocks 152R match the query parameters 21 indicated by the query request 20 by scanning each of the data blocks 152 that include a corresponding write epoch timestamp 154 that occurs at or after the read epoch timestamp 172 to complete the query request 20. That is, in some examples, the read epoch timestamp 172 establishes a read lower bound for the data block scanner 190 (i.e., a bound on how far back in the time the data block scanner 190 begins scanning), and the data block scanner 190 begins scanning for the requested data block(s) 152 at a point in time equal to the read epoch timestamp 172 and only scans data blocks 152 that were stored on the data store 150 after the read epoch timestamp 172. This is in contrast to a typical distributed storage system that begins scanning at the beginning of the life of the data structure 158 (i.e., the earliest write epoch timestamp 154). When the data structure 158 includes a large number of converted data blocks 152, and when the data block scanner 190 begins scanning at the read epoch timestamp 172 instead at time zero, the data block scanner 190 may greatly reduce the total number of data blocks 152 that are scanned in service of the query request 20. The data block scanner 190, after scanning the data blocks 152, returns any data blocks 152R to the user 12. Note that some query requests 20 result in no data blocks 152 matching the query parameters 21 and thus data block scanner 190 returns zero data blocks 152.

In some implementations, the read lower bound determiner 180, when at least one of the respective conversion timestamps 157 occurring at or before the snapshot timestamp 22 occur after the read epoch timestamp 172, determines, based on the at least one of the respective conversion timestamps 157 occurring after the read epoch timestamp 172 and at or before the snapshot timestamp 22, a read lower bound timestamp 182 that occurs before the read epoch timestamp 17. The data block scanner 190 may receive the read lower bound timestamp 182 (FIG. 3) and determine whether any data block 152R matches the query parameters 21 indicated by the query request 20 by scanning each of the data blocks 152 that include corresponding write epoch timestamps 154 occurring at or after the read lower bound timestamp 182.

Figure 3:
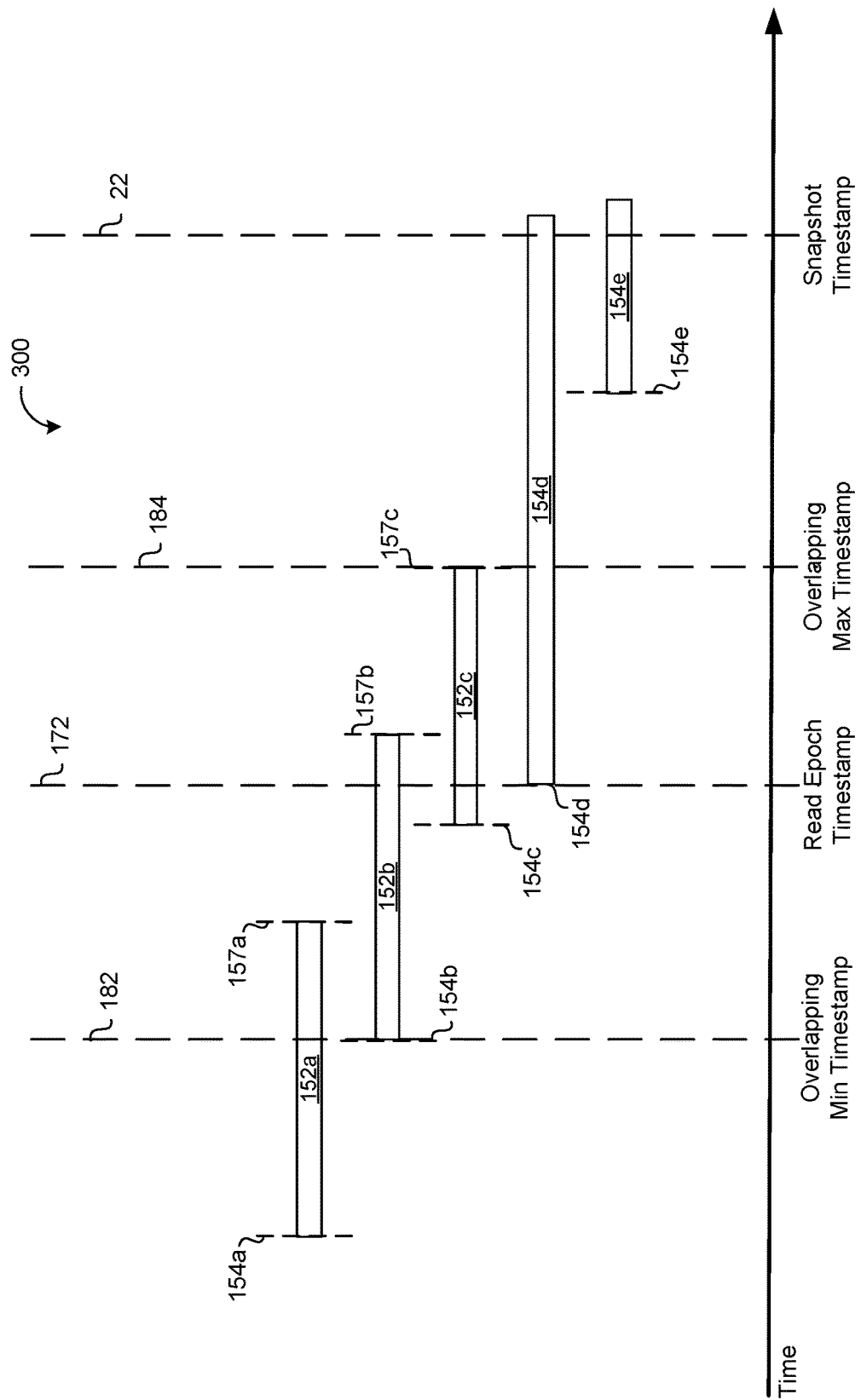
FIG. 3 is a schematic view of an exemplary timeline that includes a snapshot timestamp, a read epoch timestamp, an overlapping maximum timestamp, and an overlapping minimum timestamp.

To provide further explanation, FIG. 3 illustrates another exemplary timeline 300 showing the lifespans of the five data blocks 152a-e. Like in the previous example (FIG. 2), the read epoch timestamp 172 aligns with the write epoch timestamps 154d of the data block 152d. Here, the read lower bound determiner 180 determines an overlapping maximum timestamp 184 and an overlapping minimum timestamp 182 (also referred to previously as the read lower bound timestamp 182). In the example shown, the lifespan of some data blocks 152 overlap the read epoch timestamp 172. That is, for data blocks 152b, 152c, the range between the respective write epoch timestamp 154b, 154c and the conversion timestamp 157b, 157c includes the read epoch timestamp 172. Here, the read lower bound determiner 180 determines that the overlapping maximum timestamp 184 is the maximum (i.e., most recent) conversion timestamp 157 of the overlapping data blocks 152. In this example, the overlapping maximum timestamp 184 is equal to the conversion timestamp 157c of the data block 152c. In contrast, the read lower bound determiner 180 determines that the overlapping minimum timestamp 182 is equal to the write epoch timestamp 154 of the minimum (i.e., the earliest) write epoch timestamp 154 of the overlapping data blocks 162. In this example, the overlapping minimum timestamp 182 is equal to the write epoch timestamp 154b of the data block 152b.

In some examples, the read lower bound determiner 180 determines that the scan cannot commence at the read epoch timestamp 172 because some overlapping data blocks 162 have not yet been converted. For example, when the snapshot timestamp 22 in between the read epoch timestamp 172 and the overlapping maximum timestamp 184, at least one data block 152 overlaps with the read epoch timestamp 172 and beginning the scan at the read epoch timestamp 172 would skip an active data block 152. Thus, in this scenario, the read lower bound determiner 180 instead determines that the scan should begin at the overlapping minimum timestamp 182 (i.e., the read lower bound timestamp) and instead passes this overlapping minimum timestamp 182 to the data block scanner 190. In this case, the data block scanner 190 determines whether any data block 152R matches the query parameters 21 indicated by the query request 20 by scanning each of the data blocks 152 including corresponding write epoch timestamps 154 occurring at or after the overlapping minimum timestamp 182.

As time passes, the read epoch timestamp 172 will fall further into the past and thus, as more data blocks 152 are added to the data structure 158, beginning the scan at the read epoch timestamp 172 loses effectiveness (i.e., more and more data blocks 152 must be scanned). In some implementations, the epoch timestamp generator 170 updates the read epoch timestamp 172 to a more recent point in time. When updating the read epoch timestamp 172 to the more recent point in time, the epoch timestamp generator 170 may, beginning at the current read epoch timestamp 172C, sequentially scan data blocks 152 based on the respective write epoch timestamp 154 of each data block 152, and when the conversion indicator 156 of a scanned data block 152 indicates the scanned block 152 is active, determine that the updated read epoch timestamp 172U is equivalent to the write epoch timestamp 154 of the scanned data block 152.

Figure 4:
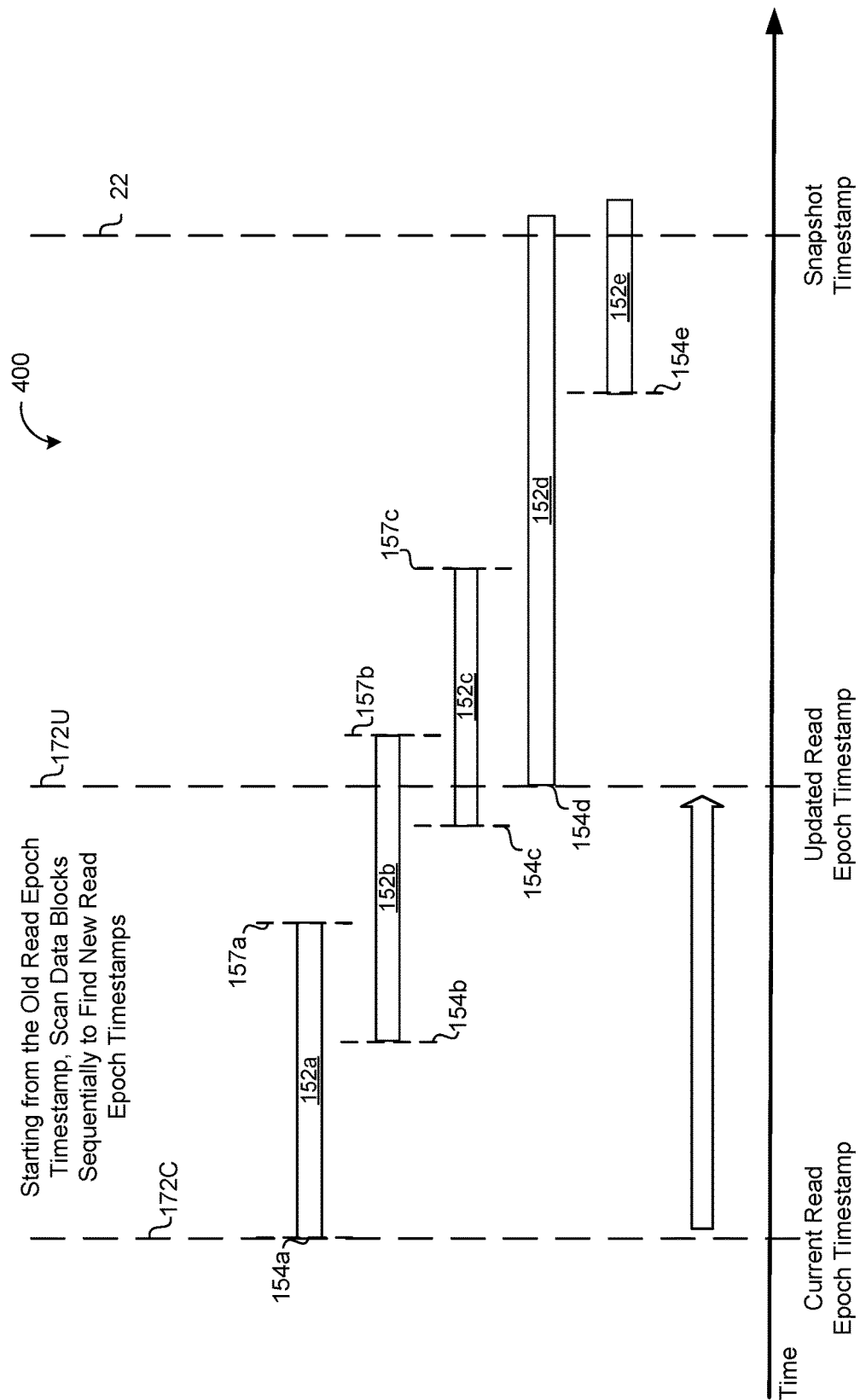
FIG. 4 is a schematic view of an exemplary timeline that includes a snapshot timestamp, a current read epoch timestamp, and an updated read epoch timestamp.

Referring now to FIG. 4, another exemplary timeline 400 again illustrates the lifespans of the five data blocks 152a-e. Here, the current read epoch timestamp 172C is equal to the write epoch timestamp 154a of data block 152a. Since the epoch timestamp generator 170 set the current read epoch timestamp 172C to the write epoch timestamp 154a, the system 100 has added additional data blocks 152 to the data structure 158 such that there is an opportunity to move the read epoch timestamp 172 to a more recent point in time. Here, the epoch timestamp generator 170 begins sequentially scanning data blocks 152 starting at data block 152b (the most recent after the data block 152a) and continues until a data block 152 is determined active. In this example, based on the snapshot timestamp 22 (which here represents the point in time that the epoch timestamp generator 170 is attempting to update the read epoch timestamp 172), the write epoch timestamp 154d of the data block 152d is selected as the point in time for the updated read epoch timestamp 172U. As a result, subsequent scans by the data block scanner 190 will now begin at the updated read epoch timestamp 172U and be able to skip scanning data block 152a.

In some scenarios, when attempting to update the read epoch timestamp 172 to a more recent point in time, the conversion indicator 156 of each data block 152 indicates that each scanned data block 152 is converted. When this occurs, the epoch timestamp generator 170 determines that the updated read epoch timestamp 172U is equivalent to the snapshot timestamp 22, as all data blocks 152 (as of the snapshot timestamp 22) are not active and may be skipped during a scan by the data block scanner 190.

In some implementations, when the epoch timestamp generator 170 is attempting to update the read epoch timestamp 172 by sequentially scanning each data block 152, the epoch timestamp generator 170 sequentially scans data blocks 152 for a predetermined amount of time. That is, in some scenarios, it is desirable to limit an amount of time the epoch timestamp generator 170 spends searching for an updated read epoch timestamp 172U. In some examples, it is desirable to limit the amount of resources dedicated to the update process so that resources are not taken from servicing query requests 20. In this scenario, when the epoch timestamp generator 170 reaches the threshold amount of time without finding an active data block 152, the epoch timestamp generator 170 sets the updated reach epoch timestamp 172U to the most recently scanned (i.e., latest) write epoch timestamp 154.

Figure 5:
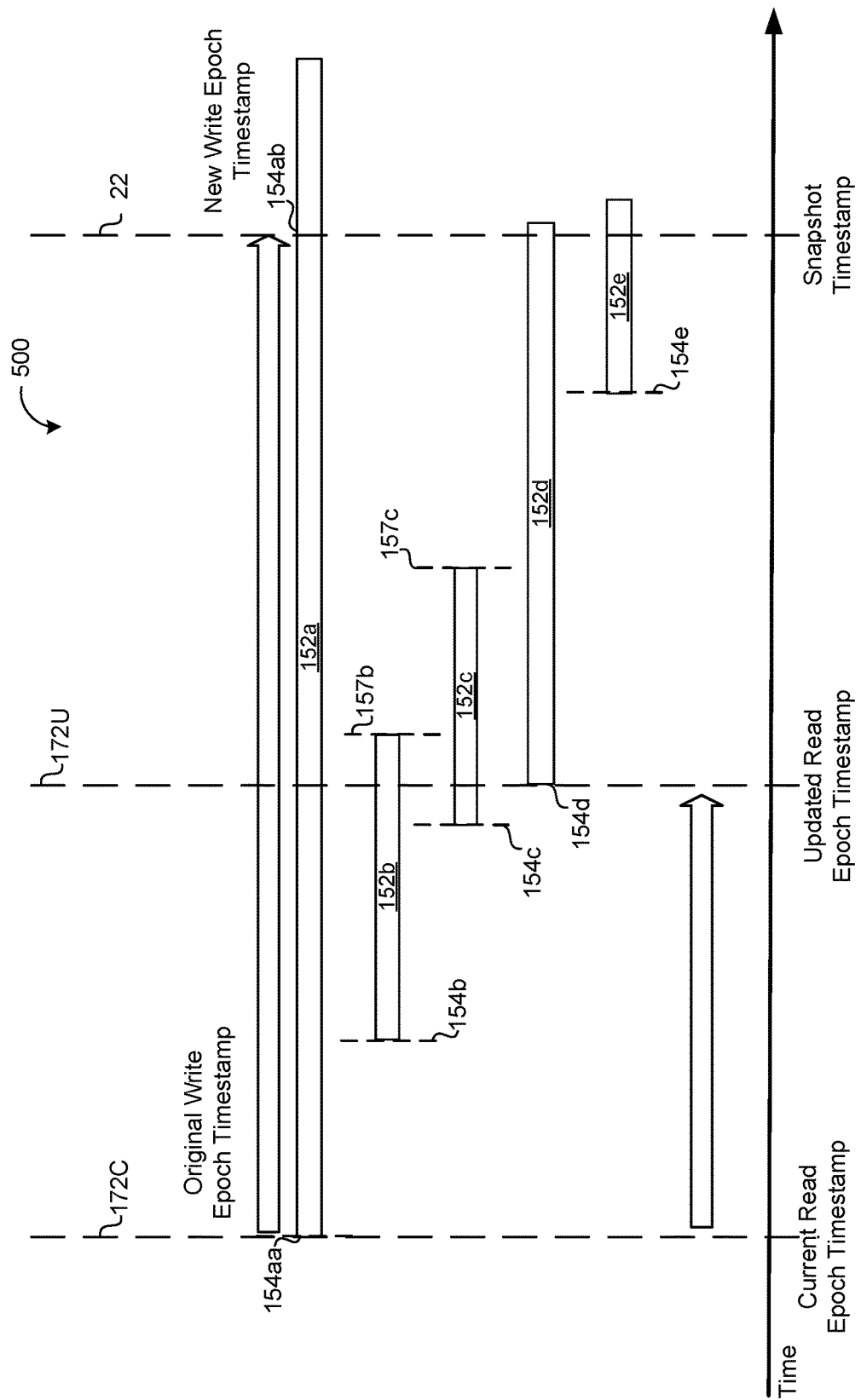
FIG. 5 is a schematic view of an exemplary timeline that includes a snapshot timestamp, a current read epoch timestamp, an updated read epoch timestamp, an original write epoch timestamp, and a new write epoch timestamp.

Referring now to FIG. 5, in some scenarios, another exemplary timeline 500 shows that the data block 152 may take an extraordinarily long time to convert. Here, data block 152a has remained active for a period of time much longer than any other data block 152b-e. In this case, the current read epoch timestamp must remain set to the original write epoch timestamp 154aa of the data block 152a as the data block 152a remains active. This reduces effectiveness as a substantial number of data blocks 152 with a write epoch timestamp 154 later than the original write epoch timestamp 154aa. In some implementations, the epoch timestamp generator 170 updates the write epoch timestamp 154 of the data block 152 with the oldest write epoch timestamp 154 that the conversion indicator 156 indicates is active.

That is, the epoch timestamp generator 170 may update the write epoch timestamp 154 to a more recent point in time.

For example, the epoch timestamp generator 170 updates the write epoch timestamp 154 to be equivalent to the snapshot timestamp 22. The result of moving the write epoch timestamp 154 forward in time (thus mimicking that the system added the data block 152 to the data structure 158 at a later point in time) allows for the opportunity to move the read epoch timestamp 172 to a more recent point in time. In the illustrated example, the epoch timestamp generator 170 updated the original write epoch timestamp 154aa to the new write epoch timestamp 154ab, which in this case is equivalent to the snapshot timestamp 22. However, the epoch timestamp generator 170 may update write epoch timestamp 154 to other values instead. In the current example, this allowed the epoch timestamp generator 170 to update the current read epoch timestamp 172C to the updated read epoch timestamp 172U.

In some implementations, the epoch timestamp generator 170 periodically attempts to update the read epoch timestamp 172 (and, in some scenarios, the write epoch timestamp 154 of one or more of the oldest data blocks 152). Optionally, the epoch timestamp generator 170 attempts to update the read epoch timestamp after a data block 152 is converted. The epoch timestamp generator 170 may require a threshold amount of time to be satisfied before attempting to update the read epoch timestamp 172. That is, the epoch timestamp generator 170 may update the read epoch timestamp 172 after a data block 152 is converted and a threshold period of time has passed since the last point in time the read epoch timestamp 172 was updated.

Other events may also trigger the epoch timestamp generator 170. For example, the epoch timestamp generator 170 attempts to update the read epoch timestamp 172 after a predetermined amount of time has passed since the last update. The epoch timestamp generator 170 may attempt to update the read epoch timestamp 172 in response to any other event (e.g., the system 100 adding a data block 152 to the data structure 158).

In some implementations, the metadata manager 160 stores multiple read epoch timestamps 172 per data structure 158. Each read epoch timestamp 172 represents the earliest one of the write epoch timestamps 154 corresponding to the data blocks 152 that are active at different snapshot timestamps 22. That is, the metadata manager may determine and store read epoch timestamps 172 for different snapshot timestamps 22 in order to increase scan efficiency for a number of different snapshot timestamps. In some examples, the metadata manager 160 may cache results from previous query requests 20. The metadata manager may use the cached results to adjust the read lower bound timestamp 182 for subsequent query requests 20.

Figure 6:
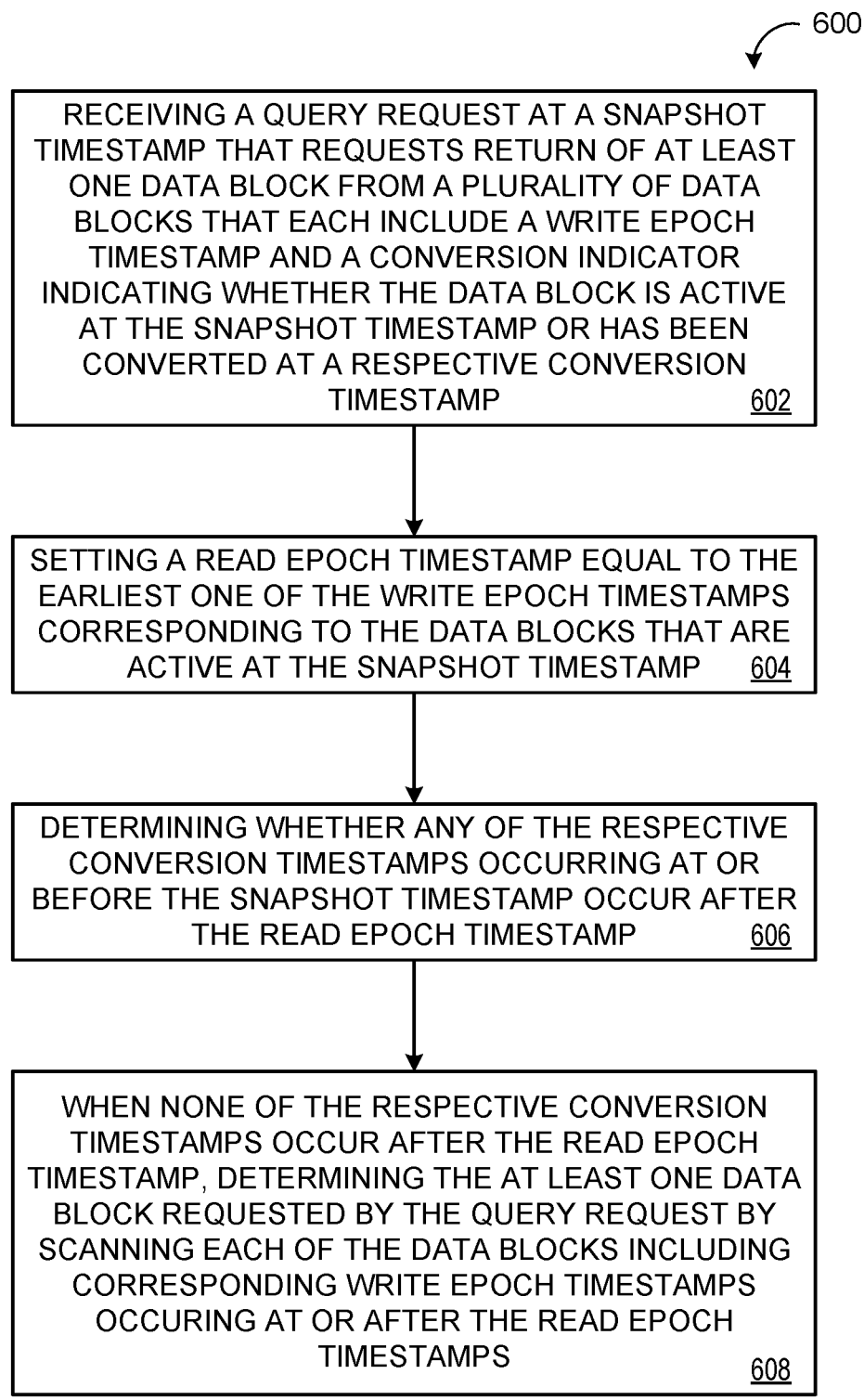
FIG. 6 is a flowchart of an example arrangement of operations for a method of managing metadata for a transactional storage system.

FIG. 6 is a flowchart of an exemplary arrangement of operations for a method 600 of managing metadata of a transactional storage system. The method 600 includes, at operation 602, receiving, at data processing hardware 144, a query request 20 at a snapshot timestamp 22. The query request 20 requests return of at least one data block 152R from a plurality of data blocks 152 stored on memory hardware 150 in communication with the data processing hardware 144 that match query parameters 21. Each data block 152 includes a corresponding write epoch timestamp 154 indicating a point in time the data block 152 was stored on the memory hardware 150 and a corresponding conversion indicator 156 indicating whether the data block 152 is active at the snapshot timestamp 22 or has been converted at a respective conversion timestamp 157 occurring at or before the snapshot timestamp 22.

At operation 604, the method 600 includes setting, by the data processing hardware 144, a read epoch timestamp 172 equal to the earliest one of the write epoch timestamps 154 corresponding to the data blocks 152 that are active at the snapshot timestamp 22. At operation 606, the method 600 includes determining, by the data processing hardware 144, whether any of the respective conversion timestamps 157 occurring at or before the snapshot timestamp 22 occur after the read epoch timestamp 172.

When none of the respective conversion timestamps 157 occurring at or before the snapshot timestamp 22 occur after the read epoch timestamp 154, the method 600 includes, at operation 608, determining, by the data processing hardware 144, whether any data block 152R matches the query parameters 21 indicated by the query request 20 by scanning each of the data blocks 152 that include corresponding write epoch timestamps 154 occurring at or after the read epoch timestamp 172.

Figure 7:
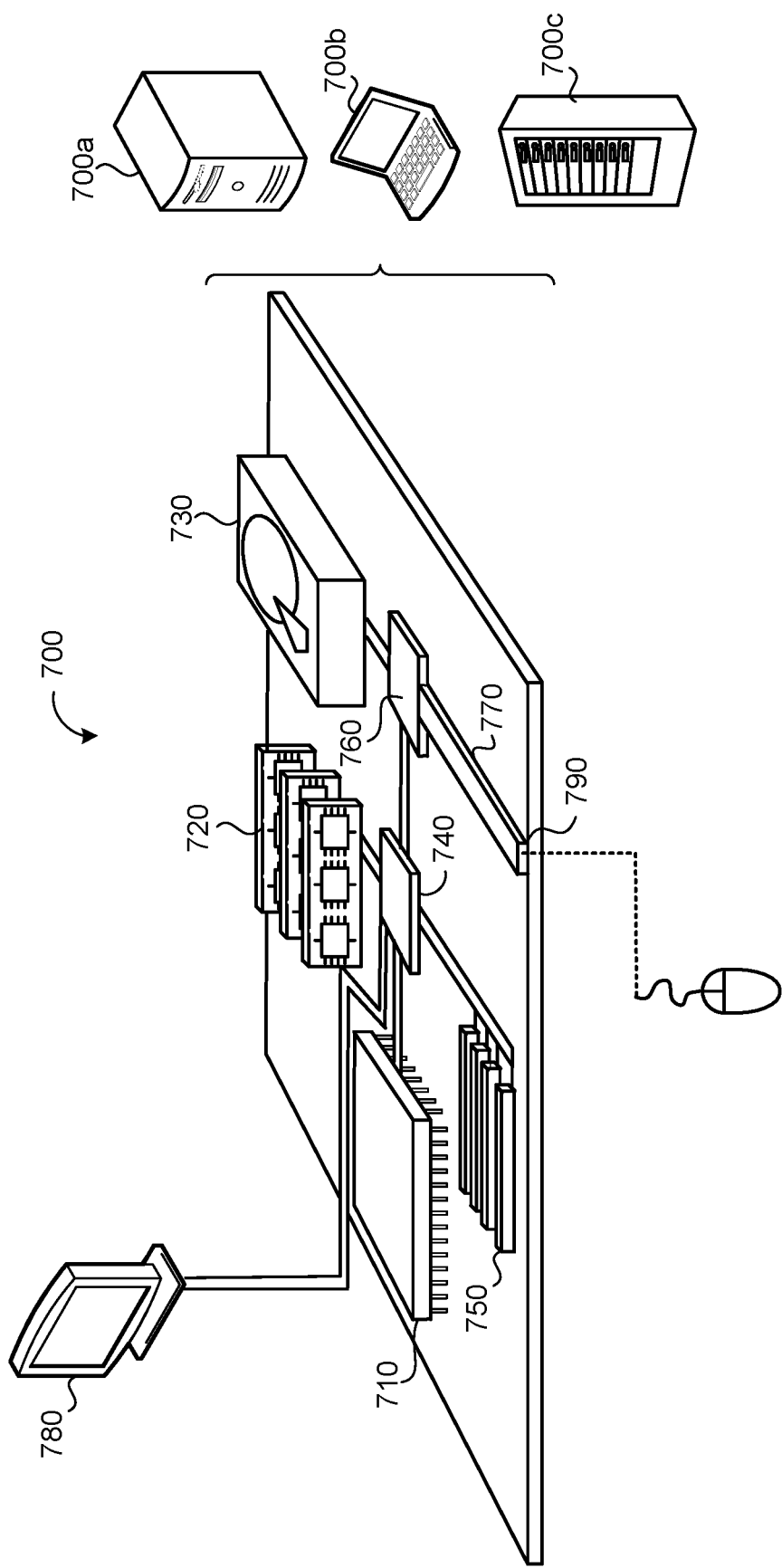
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
    writing, at memory hardware in communication with the data processing hardware, a plurality of data blocks, each data block in the plurality of data blocks comprising a respective write epoch timestamp indicating a point in time the data block was stored on the memory hardware;
    determining a subset of data blocks from the plurality of data blocks that are active;
    receiving a query request from a user, the query request requesting return of any data blocks from the plurality of data blocks stored on the memory hardware that match query parameters;
    setting a read epoch timestamp equal to the earliest one of the respective write epoch timestamps of the subset of data blocks that are active;
    determining whether any of the plurality of data blocks having a respective write epoch timestamp later than the read epoch timestamp matches the query parameters; and
    when one or more of the plurality of data blocks have the respective write epoch timestamp later than the read epoch timestamp matches the query parameters, returning the matching data blocks to the user.

2. The method of claim 1, wherein determining whether any of the plurality of data blocks having a respective write epoch timestamp later than the read epoch timestamp matches the query parameters comprises sequentially scanning the plurality of data blocks based on the respective write epoch timestamps.

3. The method of claim 1, wherein the operations further comprise:
    determining that each data block in the plurality of data blocks is active; and
    setting the read epoch timestamp equal to a time associated with the query request.

4. The method of claim 3, wherein setting the read epoch timestamp equal to the time associated with the query request comprises setting the read epoch timestamp equal to a snapshot timestamp.

5. The method of claim 1, wherein the operations further comprise updating the read epoch timestamp to a more recent point in time.

6. The method of claim 5, wherein updating the read epoch timestamp comprises:
    beginning at the read epoch timestamp, sequentially scanning the plurality of data blocks based on the respective write epoch timestamp of each data block; and
    when a scanned data block is active, determining that the updated read epoch timestamp is equivalent to the respective write epoch timestamp of the active data block.

7. The method of claim 6, wherein sequentially scanning the plurality of data blocks comprises sequentially scanning the plurality of data blocks for a predetermined amount of time.

8. The method of claim 6, wherein sequentially scanning the plurality of data blocks comprises updating the respective write epoch timestamp of each data block using the oldest write epoch timestamp that is active.

9. The method of claim 5, wherein updating the read epoch timestamp occurs after a data block is inactivated.

10. The method of claim 5, wherein updating the read epoch timestamp occurs after a data block is inactivated and a threshold period of time has passed since a last point in time the read epoch timestamp was updated.

11. A system comprising:
    data processing hardware; and
    memory hardware in communication with the data processing hardware, the memory hardware storing instructions that when executed on the data processing hardware cause the data processing hardware to perform operations comprising:
        writing, at memory hardware in communication with the data processing hardware, a plurality of data blocks, each data block in the plurality of data blocks comprising a respective write epoch timestamp indicating a point in time the data block was stored on the memory hardware;
        determining a subset of data blocks from the plurality of data blocks that are active;
        receiving a query request from a user, the query request requesting return of any data blocks from the plurality of data blocks stored on the memory hardware that match query parameters;
        setting a read epoch timestamp equal to the earliest one of the respective write epoch timestamps of the subset of data blocks that are active;
        determining whether any of the plurality of data blocks having a respective write epoch timestamp later than the read epoch timestamp matches the query parameters; and
        when one or more of the plurality of data blocks have the respective write epoch timestamp later than the read epoch timestamp matches the query parameters, returning the matching data blocks to the user.

12. The system of claim 11, wherein determining whether any of the plurality of data blocks having a respective write epoch timestamp later than the read epoch timestamp matches the query parameters comprises sequentially scanning the plurality of data blocks based on the respective write epoch timestamps.

13. The system of claim 11, wherein the operations further comprise:
    determining that each data block in the plurality of data blocks is active; and
    setting the read epoch timestamp equal to a time associated with the query request.

14. The system of claim 13, wherein setting the read epoch timestamp equal to the time associated with the query request comprises setting the read epoch timestamp equal to a snapshot timestamp.

15. The system of claim 11, wherein the operations further comprise updating the read epoch timestamp to a more recent point in time.

16. The system of claim 15, wherein updating the read epoch timestamp comprises:
    beginning at the read epoch timestamp, sequentially scanning the plurality of data blocks based on the respective write epoch timestamp of each data block; and
    when a scanned data block is active, determining that the updated read epoch timestamp is equivalent to the respective write epoch timestamp of the active data block.

17. The system of claim 16, wherein sequentially scanning the plurality of data blocks comprises sequentially scanning the plurality of data blocks for a predetermined amount of time.

18. The system of claim 16, wherein sequentially scanning the plurality of data blocks comprises updating the respective write epoch timestamp of each data block using the oldest write epoch timestamp that is active.

19. The system of claim 15, wherein updating the read epoch timestamp occurs after a data block is inactived.

20. The system of claim 15, wherein updating the read epoch timestamp occurs after a data block is inactived and a threshold period of time has passed since a last point in time the read epoch timestamp was updated.

* * * * *